United States Patent
Sjöö et al.

(10) Patent No.: US 9,283,631 B2
(45) Date of Patent: Mar. 15, 2016

(54) CUTTING INSERT FOR A MILLING TOOL

(75) Inventors: Strure Sjöö, Gävle (SE); Mats Wennmo, Hässleholm (SE)

(73) Assignee: Sandvik Intellectual Property AB, Sandviken (SE)

(*) Notice: Subject to any disclaimer, the term of this patent is extended or adjusted under 35 U.S.C. 154(b) by 402 days.

(21) Appl. No.: 13/359,595

(22) Filed: Jan. 27, 2012

(65) Prior Publication Data

US 2012/0207555 A1 Aug. 16, 2012

(30) Foreign Application Priority Data

Feb. 11, 2011 (SE) ..................................... 1150112

(51) Int. Cl.
*B23F 21/16* (2006.01)

(52) U.S. Cl.
CPC ............. *B23F 21/166* (2013.01); *B23F 21/163* (2013.01); *Y10T 407/23* (2015.01); *Y10T 407/235* (2015.01)

(58) Field of Classification Search
CPC ............. B23C 2200/0405; B23C 2200/0433; B23C 2200/0411; B23C 2200/165; B23F 1/06; B23F 21/16; B23F 21/163; B23F 21/166; B23F 21/262; B23F 21/264
USPC ......... 407/25, 23, 15, 17, 19, 27, 42, 61, 113, 407/114
See application file for complete search history.

(56) References Cited

U.S. PATENT DOCUMENTS

| 2,698,477 | A | | 1/1955 | Jarno |
| 3,688,368 | A | | 9/1972 | Bodem |
| 3,740,808 | A | * | 6/1973 | Shioya ............................ 407/25 |
| 3,766,618 | A | | 10/1973 | Janninck |
| 3,892,022 | A | | 7/1975 | Johnson |

(Continued)

FOREIGN PATENT DOCUMENTS

| CH | 519957 A | * 3/1972 |
| EP | 2 072 162 | 6/2009 |

(Continued)

OTHER PUBLICATIONS

Office Action (with English Translation) for Chinese Application No. 201210030477.5, dated Apr. 3, 2015.

(Continued)

*Primary Examiner* — Daniel Howell
*Assistant Examiner* — Alan Snyder
(74) *Attorney, Agent, or Firm* — Morgan, Lewis & Bockius LLP

(57) ABSTRACT

A cutting insert for a gear milling tool comprises an under side, an opposite upper side that forms a chip surface and is parallel to an extension plane (p), a circumferential edge side that connects the upper side and the under side. A centre axis (A) extends through the under side. A symmetry line (S) is perpendicular to the centre axis. A first cutting edge comprises a primary main cutting edge, a secondary main cutting edge—which are symmetrical in respect of the symmetry line—and a transverse end cutting edge between the primary and the secondary main cutting edge. A normal to the extension plane (p) forms an acute clearance angle with the edge side at least along the first cutting edge so that the cutting insert obtains a positive cutting geometry.

32 Claims, 8 Drawing Sheets

(56) References Cited

U.S. PATENT DOCUMENTS

| | | | |
|---|---|---|---|
| 4,218,159 A | | 8/1980 | Langen |
| 4,572,042 A | * | 2/1986 | Wiman ........................ 82/1.11 |
| 5,593,254 A | | 1/1997 | Peters |
| 5,921,721 A | * | 7/1999 | Hintze et al. ................. 407/113 |
| 6,413,021 B1 | * | 7/2002 | Koch et al. ..................... 407/43 |
| 6,669,412 B1 | * | 12/2003 | Hirose et al. ................. 407/113 |
| 6,684,752 B2 | * | 2/2004 | Satran et al. .................... 83/835 |
| 6,986,626 B2 | * | 1/2006 | Gati ............................. 407/113 |
| 7,387,474 B2 | * | 6/2008 | Edler et al. ................... 407/113 |
| 7,476,063 B2 | * | 1/2009 | Wickman et al. ............. 407/113 |
| 7,537,419 B2 | * | 5/2009 | Sjoberg et al. ............... 407/103 |
| 7,544,023 B2 | * | 6/2009 | Lof et al. ..................... 407/113 |
| 7,758,287 B2 | * | 7/2010 | Alm et al. .................... 407/113 |
| 2003/0005803 A1 | | 1/2003 | Satran et al. |
| 2005/0249559 A1 | | 11/2005 | Lof et al. |
| 2006/0216121 A1 | | 9/2006 | Edler et al. |
| 2007/0245866 A1 | | 10/2007 | Wickman et al. |
| 2010/0215446 A1 | * | 8/2010 | Wandeback .................... 407/51 |
| 2012/0207553 A1 | | 8/2012 | Sjöö et al. |

FOREIGN PATENT DOCUMENTS

| | | |
|---|---|---|
| JP | S49-19509 | 2/1974 |
| JP | S52-2388 | 1/1977 |
| JP | 2001-353621 | 12/2001 |
| JP | 3729634 | 12/2005 |
| JP | 2006-255883 | 9/2006 |
| JP | 4471263 | 6/2010 |
| WO | WO 03/089203 | 10/2003 |

OTHER PUBLICATIONS

Notice of Reasons for Rejection (with English Translation) for Japanese Application No. 2012-027224, dated Sep. 1, 2015.

* cited by examiner

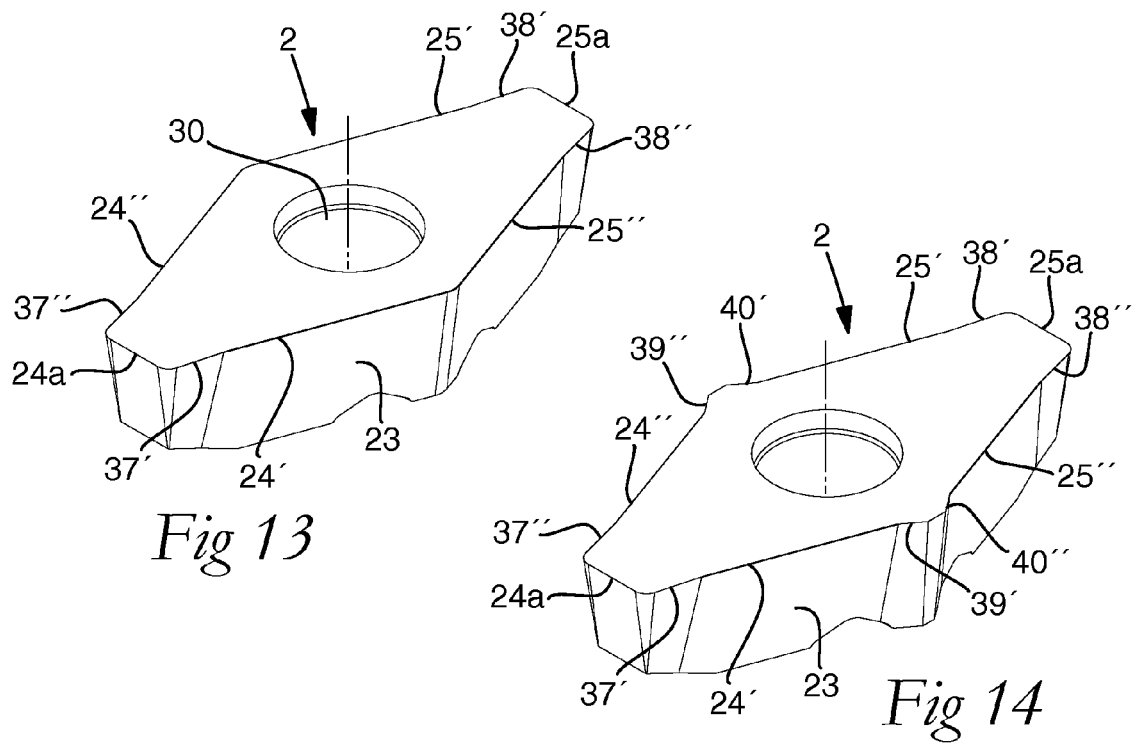
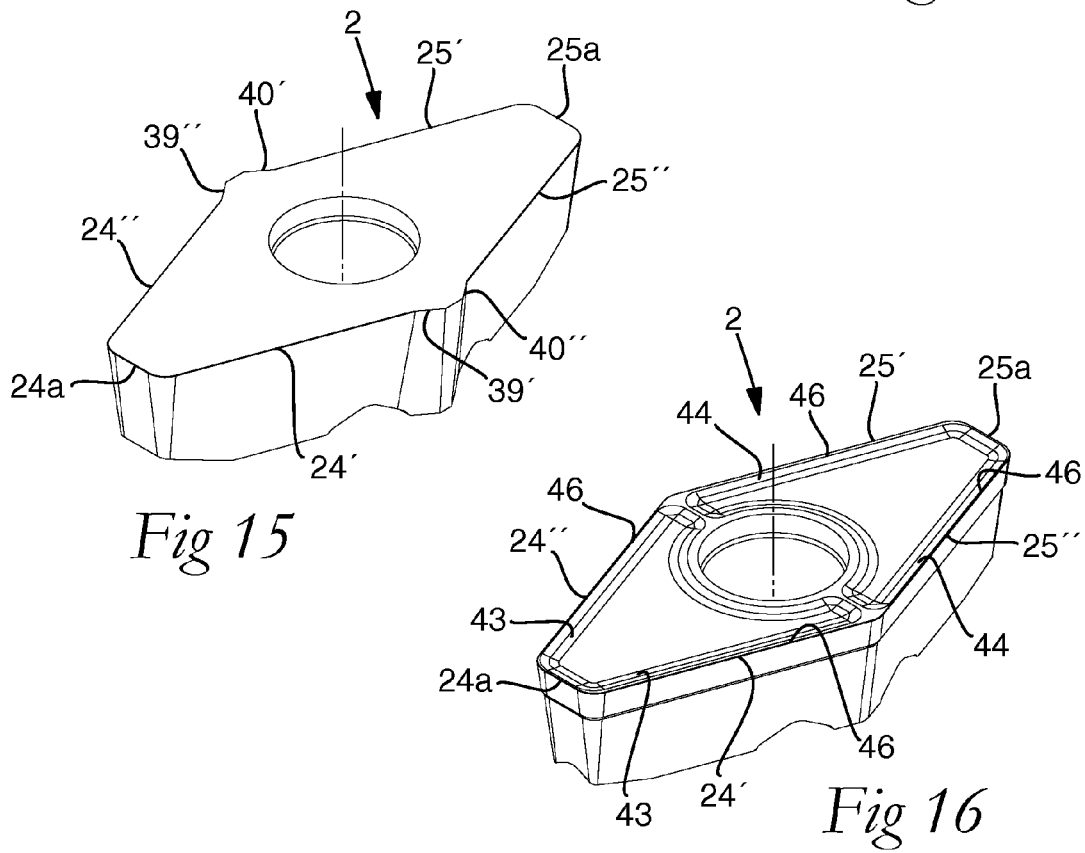

CUTTING INSERT FOR A MILLING TOOL

RELATED APPLICATION DATA

This application is based on and claims priority under 37 U.S.C. §119 to Swedish Application No. 1150112-9, filed Feb. 11, 2011, the entire contents of which are incorporated herein by reference.

FIELD OF THE DISCLOSURE

The present disclosure relates to a cutting insert for a milling tool for gear milling and more precisely for so-called hobbing. More particularly, the present disclosure relates to a cutting insert for a milling tool formed for gear milling in the form of hobbing of a workpiece having cogs, such as gear wheels, racks and the like.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

U.S. Pat. No. 5,593,254 shows a cutting insert for a milling tool formed for the hobbing of workpieces having cogs, such as gear wheels, racks and the like. The milling tool comprises a tool body that defines a rotation axis and should have a fixing end, an opposite outer end, and a peripheral surface that extends around the rotation axis between the fixing end and the outer end. The tool body comprises a large number of seats that are arranged one after the other. The cutting insert, which is arranged in one of said seats, comprises an under side, an opposite upper side that forms a chip surface and extends parallel to an extension plane, and a circumferential edge side that connects the upper side and the under side. A centre axis extends through the under side and the upper side and a symmetry line is perpendicular to and intersects the centre axis. A first cutting edge comprises a primary main cutting edge, a secondary main cutting edge—which are symmetrical in respect of the symmetry line and formed where the edge side meets the chip surface—and a transverse end cutting edge that extends between the primary main cutting edge and the secondary main cutting edge. The cutting insert is fastened by a screw that extends through an eccentric hole through the cutting insert. The cutting insert has a ridge on the under side that is in engagement with a groove in the seat. The cutting insert has a negative cutting geometry, which makes it necessary to arrange the cutting insert so that the chip surface leans in relation to a radial plane in respect of the rotation axis. This causes an error of the involute of the cogs that are to be milled.

EP-A-2 072 162 shows another cutting insert for a milling tool formed for the hobbing of a workpiece having cogs, such as gear wheels, racks and the like. The cutting insert comprises a row of three teeth. Each tooth is formed for engagement with a gash of the workpiece. The cutting insert has an upper side that forms a chip surface for each tooth. The chip surfaces of the three teeth are lying in a common plane, which means that a normal of the chip surface will form an acute angle with a tangent of the helix line, along which the teeth are arranged and where this intersects the chip surface at least for two ones of the teeth. The chip surface for each tooth leans downward from the end cutting edge but is perpendicular to the edge sides along the main cutting edges, which gives a negative cutting geometry along the same.

JP-A-2001-353621 shows another cutting insert for a milling tool for hobbing. This cutting insert is formed with a row of teeth.

SUMMARY

It is known to manufacture gear milling tools having fixed cutting inserts that are formed by cutting machining of the tool body. The disclosed milling tool and cutting insert belongs to the area of milling tools wherein the cutting inserts instead are formed of a plurality of replaceable cutting inserts that are arranged one after the other along a helix line that extends around the tool body one or more revolutions at a fixed pitch.

Milling tools are provided for the gear milling of gear wheels in different modules Mn depending on the size of the gear wheels to be manufactured. There are modules from Mn=1 for very small gear wheels, to Mn=22 or more for very great gear wheels. The presently disclosed cutting insert can be used for milling tools for the manufacture of gear wheels of all modules but is particularly suitable for the milling of gear wheels with Mn=3 to Mn=8.

Milling tools for gear milling are provided in different tolerance classes according to the German standard DIN. The finest class is AAA. Then the classes AA, A, B, C, D follow. The tolerance classes A and B are required for the manufacture of gear wheels for gearboxes for motor vehicles. The disclosed cutting insert is intended for milling tools in at least tolerance class B.

The object of the present invention is to provide a replaceable cutting insert for a milling tool for gear milling. The cutting insert should allow a high accuracy in the cutting machining of cogs. Furthermore, a cutting insert allowing gear cutting in an economically favourable way is desired.

Said object is achieved by the cutting insert that is indicated by way of introduction and characterized in that a normal to the extension plane forms an acute clearance angle with the edge side at least along the first cutting edge so that the cutting insert obtains a positive cutting geometry.

By such a positive cutting geometry along the primary main cutting edge, the secondary main cutting edge and the end cutting edge, a high accuracy is guaranteed since the cutting insert can be positioned in an optimal way in respect of the milling machining. The desired tolerance level is achieved when the cutting insert is arranged in the milling tool since the normal of the extension plane can extend parallel to the tangent of the helix line. Thereby, the involute of the cogs of the workpiece to be manufactured can obtain the desired shape. Because the cutting insert is replaceable, it can in a simple way be guaranteed that the milling tool always has sharp cutting edges. The straight segment of the end cutting edge guarantees milling of a suitable bottom surface of each gash between adjacent cogs or the like of the workpiece to be milled. The tool body of the milling tool will enjoy a very long service life. It should be noted that both the primary main cutting edge and the secondary main cutting edge are in engagement with the workpiece during the gear milling. The primary main cutting edge is the main cutting edge that first engages with a gash and machines the "front" side of the gash, while the secondary main cutting edge machines the "rear" side of the gash. The primary main cutting edge is loaded more than the secondary main cutting edge during the cutting machining.

According to one exemplary embodiment, the straight segment extends perpendicular to the symmetry line, or essentially perpendicular to the symmetry line.

According to an additional exemplary embodiment, the symmetry line forms a pressure angle α with each one of said primary and secondary main cutting edges, the pressure angle α being in the interval of 18-32°. According to a first variant, the pressure angle α may be, for instance, 20°. According to a second variant, the pressure angle α may be, for instance, 30°.

According to an additional exemplary embodiment, the chip surface comprises a reinforcement bevel that extends inward from at least one of said primary and secondary main cutting edges. Thus, it is possible to give the cutting insert an asymmetrical design by the reinforcement bevel only extending from the primary main cutting edges, which are loaded heavier than the secondary main cutting edges. It is, however, advantageous to let the reinforcement bevel extend inward from both the primary main cutting edges and from the secondary main cutting edges. Advantageously, the reinforcement bevel may extend inward also from the end cutting edges. The reinforcement bevel contributes to strengthen the very edge that is in direct engagement with the workpiece, thereby contributing to prolong the service life of the cutting insert.

According to an additional exemplary embodiment, the reinforcement bevel has a width across said primary and secondary main cutting edges, the width along the primary main cutting edge being greater than the width along the secondary main cutting edge. In such a way, also the above mentioned asymmetrical design can be obtained. The design of the cutting insert may be adapted to the fact that the load on the primary main cutting edge is heavier than the load on the secondary main cutting edge.

According to an additional exemplary embodiment, the reinforcement bevel extends upward at least from the primary main cutting edge. By such an inclination upward, the reinforcement bevel can strengthen the cutting edge further.

According to an additional exemplary embodiment, the chip surface comprises chip-forming means that are formed to bend and break the chips formed during the gear milling.

According to an additional exemplary embodiment, the chip-forming means comprise a flank that leans downward and extends inward from the reinforcement bevel.

According to an additional exemplary embodiment, the primary main cutting edges comprise each a primary outer edge deflection in the vicinity of the respective end cutting edge, and the secondary main cutting edges comprise each a secondary outer edge deflection in the vicinity of the respective end cutting edge. Such an outer edge deflection of the main cutting edges provides a cutting edge that in an advantageous way allows so-called protuberance cutting, i.e., a deeper or wider cutout in the vicinity of the bottom surface of the gash of the workpiece. Advantageously, the primary and secondary outer edge deflections may extend parallel to the extension plane.

According to an additional exemplary embodiment, the cutting insert comprises a second cutting edge comprising a primary main cutting edge, a secondary main cutting edge—which are symmetrical in respect of the symmetry line and formed where the edge side meets the chip surface—and a transverse end cutting edge that extends between the primary main cutting edge and the secondary main cutting edge and that comprises a straight segment, and that the cutting insert is indexable by rotation around the centre axis between a first insert position, in which the first cutting edge is in engagement with the workpiece, and a second insert position, in which the second cutting edge is in engagement with the workpiece. Thanks to the cutting insert being provided with two cutting edges, which both have a primary main cutting edge, a secondary main cutting edge and an end cutting edge, the cutting insert obtains the indicated indexing capability so that the service life of the cutting insert can be doubled. Therefore, the degree of utilization and the yield can be essentially improved. In milling tools for hobbing, there is a very limited space for the arrangement of cutting inserts. It should be noted that the cutting insert advantageously is identical in the first insert position and the second insert position in respect of the workpiece.

According to an additional exemplary embodiment, the upper side of the cutting insert has a rhombic basic shape with a relatively long diagonal line coinciding with the symmetry line, and a relatively short diagonal line being perpendicular to the relatively long diagonal line.

According to an additional exemplary embodiment, said primary main cutting edges comprise each a primary inner edge deflection in the vicinity of the relatively short diagonal line, and said secondary main cutting edges each a secondary inner edge deflection in the vicinity of the relatively short diagonal line. Such an inner edge deflection of the main cutting edges provides a cutting edge that allows an advantageous so-called edge chamfer involute cutting at the upper ends of the cogs. Advantageously, the primary and secondary inner edge deflections may extend parallel to, or in, the extension plane.

According to an additional exemplary embodiment, the cutting insert comprises a fastening hole that extends through the upper side and the under side, the cutting insert being formed to be attached in a tool seat of the milling tool by means of a fixing screw that extends through the fastening hole into a threaded hole of the milling tool.

According to an additional exemplary embodiment, the under side has a recess that extends from the under side and that is arranged to be in engagement with a corresponding projection of a support surface of the milling tool. Advantageously, the recess may comprise a first elongate valley and two second elongate valleys, the first elongate valley extending parallel to the symmetry line, and the second elongate valleys intersecting the first elongate valley, preferably at a right angle.

An exemplary embodiment of a cutting insert for a milling tool formed for gear milling in the form of hobbing of a workpiece having cogs comprises an under side, an opposite upper side that forms a chip surface and extends parallel to an extension plane (p), a circumferential edge side that connects the upper side and the under side, a centre axis (A) that extends through the under side and the upper side, a symmetry line (S) that is perpendicular to and intersects the centre axis (A), and a first cutting edge comprising a primary main cutting edge and a secondary main cutting edge, which are symmetrical in respect of the symmetry line (S) and formed where the edge side meets the chip surface, and a transverse end cutting edge that extends between the primary main cutting edge and the secondary main cutting edge and that comprises a straight segment, wherein a normal to the extension plane (p) forms an acute clearance angle (δ) with the edge side at least along the first cutting edge so that the cutting insert obtains a positive cutting geometry.

BRIEF DESCRIPTION OF THE DRAWINGS

The following detailed description of preferred embodiments can be read in connection with the accompanying drawings in which like numerals designate like elements and in which:

FIG. 13 shows a perspective view of a cutting insert according to a second exemplary embodiment.

FIG. 14 shows a perspective view of a cutting insert according to a third exemplary embodiment.

FIG. 15 shows a perspective view of a cutting insert according to a fourth exemplary embodiment.

FIG. 16 shows a perspective view of a cutting insert according to a fifth exemplary embodiment.

DETAILED DESCRIPTION

Figure 1:
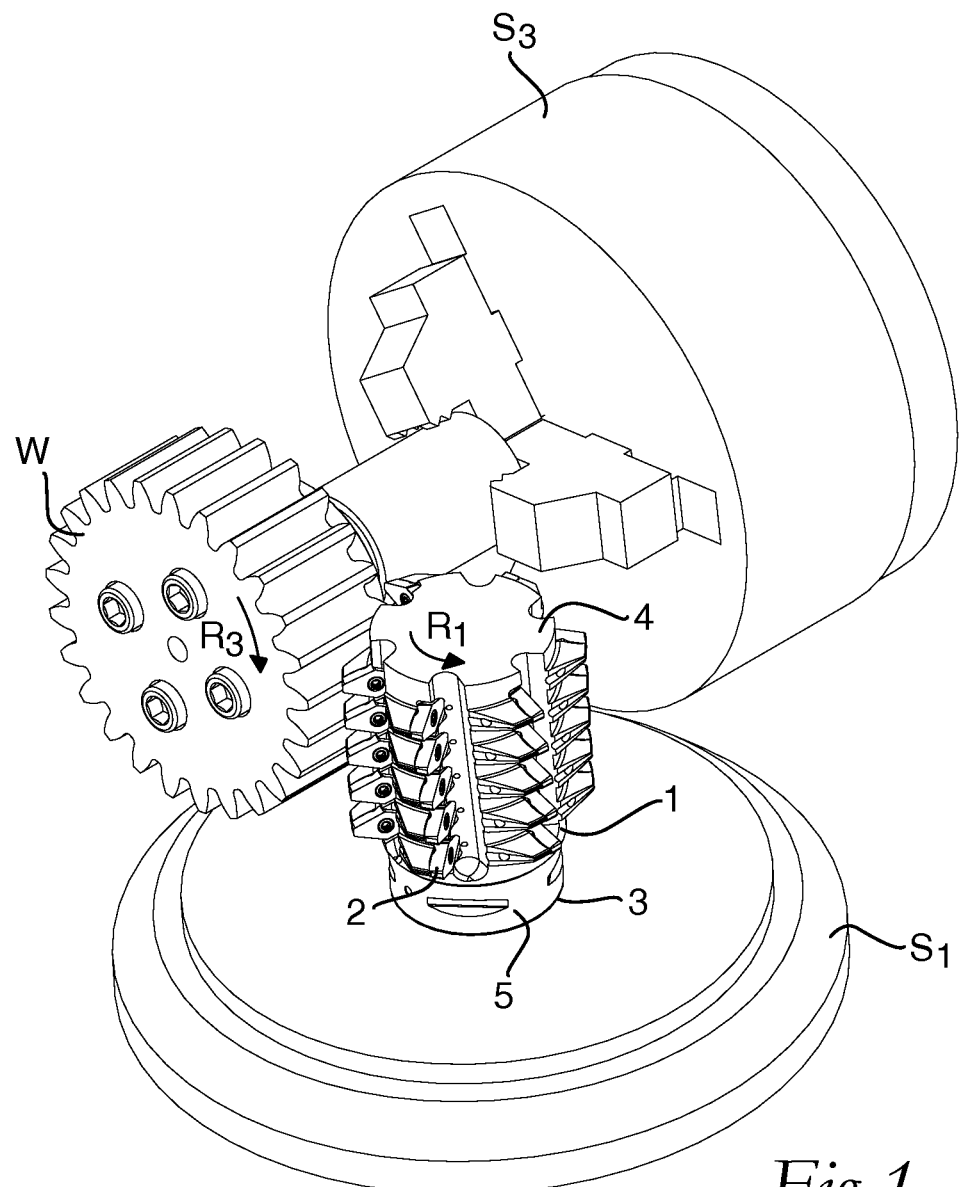
FIG. 1 schematically shows a perspective view of parts of a machine tool including a milling tool having a plurality of cutting inserts.

FIGS. 1-7 show a milling tool formed for gear cutting and more precisely for so-called hobbing of a workpiece W having cogs. The milling tool is suitable for the cutting machining of different workpieces W, such as gear wheels, racks, splines, impellers for hydraulic pumps, and similar cogged elements. The milling tool comprises a tool body 1, which may be manufactured from steel, and a large number of replaceable cutting inserts 2.

The tool body 1 defines a rotation axis C1 and has a fixing end 3 and an opposite outer end 4. The rotation axis C1 extends through the fixing end 3 and the outer end 4. At the fixing end 3, there is a fastening pin 5, see FIG. 5, for the fixing of the tool body 1 and the milling tool in a tool spindle S1 of a milling cutter or multioperation machine. The tool body 1 is rotatable around the rotation axis C1 in a direction of rotation R1 (clockwise rotation to the right as viewed from within the tool spindle S1).

The workpiece W is fixed in a workpiece spindle S3 and is rotatable around a rotation axis C3 in a direction of rotation R3. In the embodiments shown, the workpiece W rotates clockwise to the right as viewed from outside.

Figure 4:
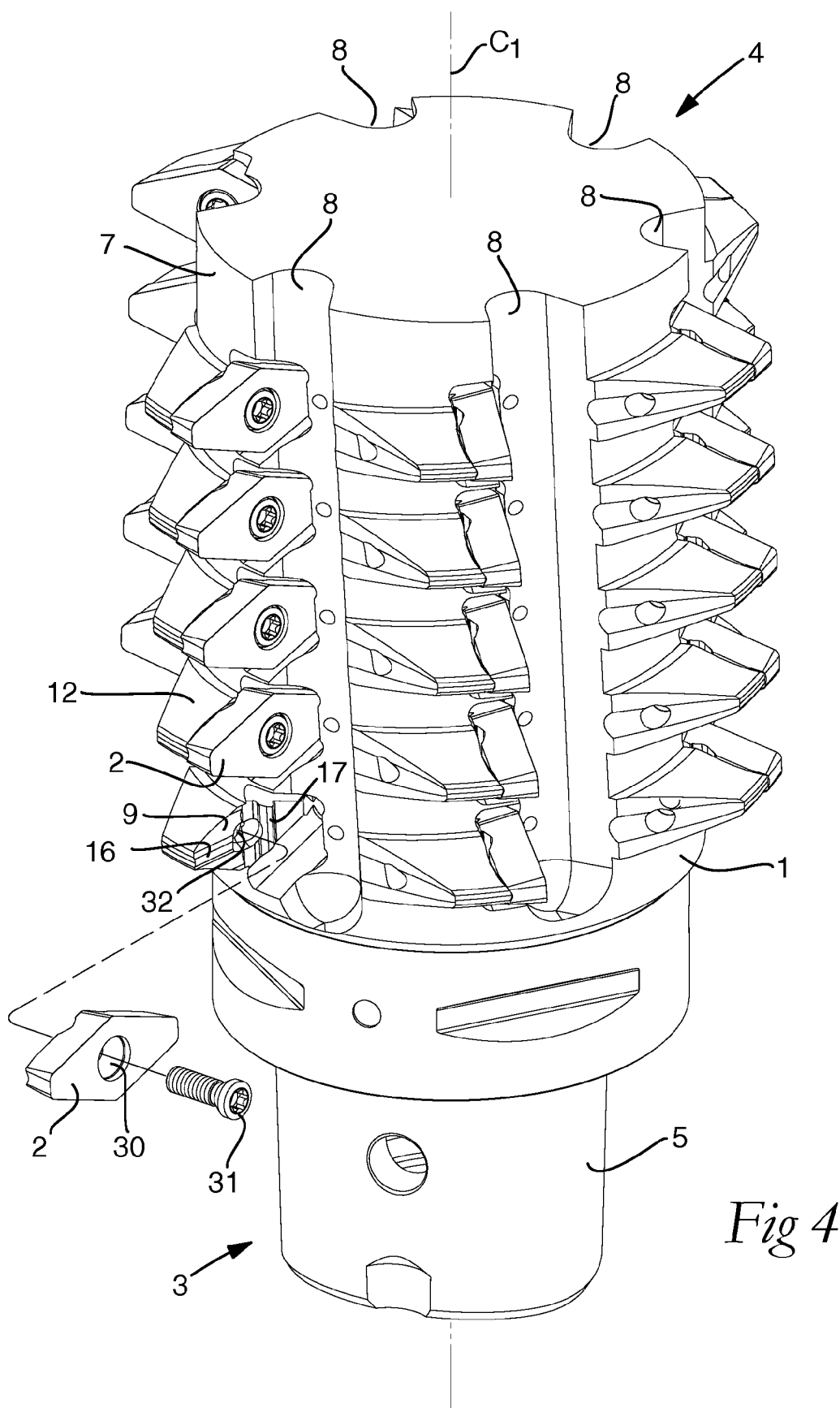
FIG. 4 schematically shows a perspective view of the milling tool in FIG. 1 on a greater scale.
Figure 5:
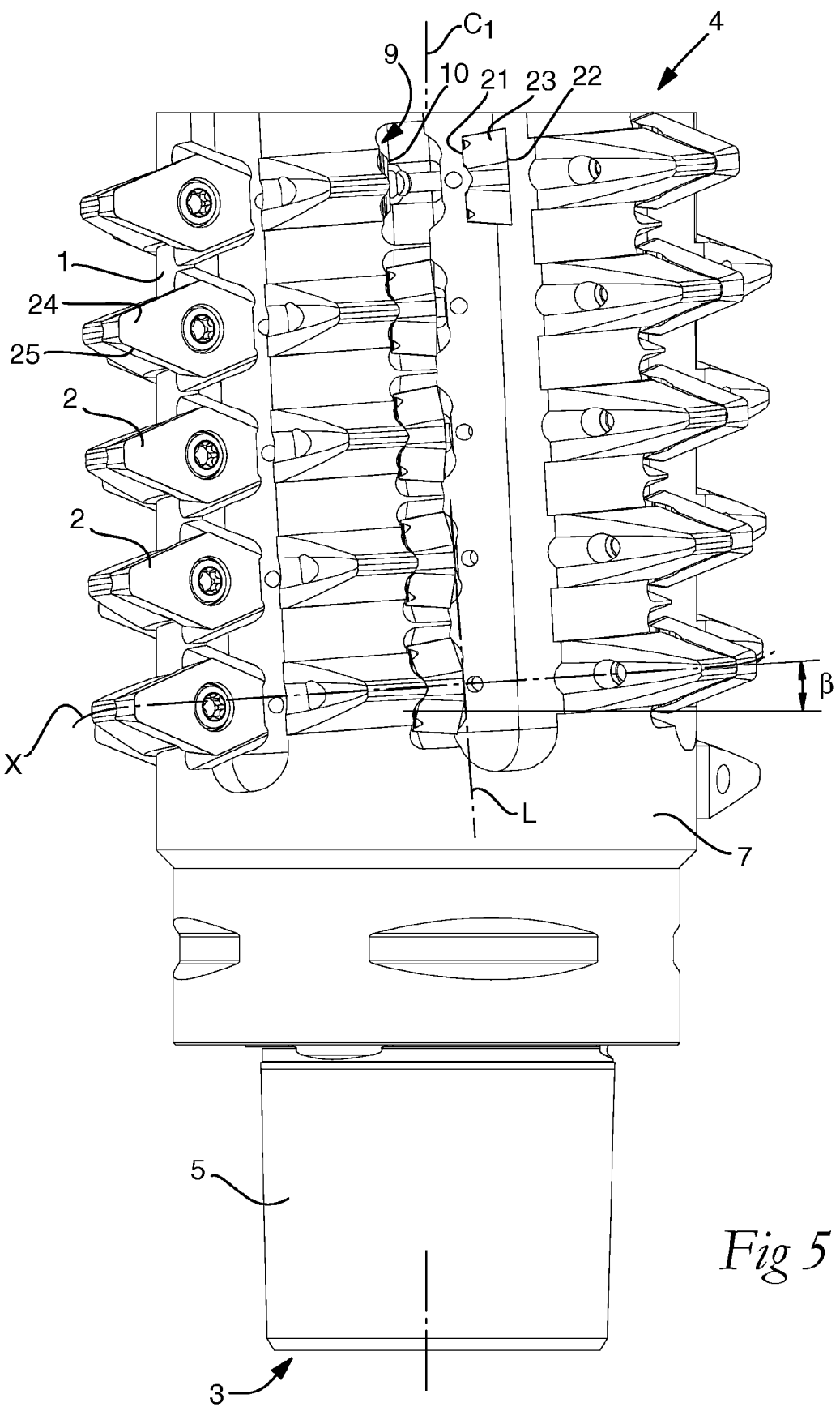
FIG. 5 schematically shows a side view of the milling tool in FIG. 1 on a greater scale.

The tool body 1 has a peripheral surface 7 that extends around the rotation axis C1 between the fixing end 3 and the outer end 4, and more precisely from the outer end 4 up to the fastening pin 5, see FIGS. 4 and 5. The tool body 1 comprises a plurality of elongate recesses 8 in the peripheral surface 7. In the embodiment illustrated, the milling tool comprises six such recesses 8. However, it should be noted that the milling tool may comprise another number of recesses 8, for instance 4, 5, 7 or 8 recesses 8.

The tool body 1 also comprises a large number of separated seats 9, see in particular FIGS. 4-7, which are arranged at the peripheral surface 7. Each seat 9 is formed to receive one of the cutting inserts 2. The seats 9, and the cutting inserts 2, are arranged one after the other along a helix line x having a constant pitch, see FIG. 5. In the embodiments shown, the pitch direction of the helix line x is to the right. The pitch direction may also be to the left depending on the cog to be manufactured. The pitch angle β of the helix line x may be 1-10°.

Each seat 9 comprises a support surface 10 that is arranged to allow or form a support to the cutting insert 2. Each seat 9 also comprises a pocket 11 that extends inward from the peripheral surface 7, and a protuberance 12 that projects from the peripheral surface 7. A part of the support surface 10 is formed of the protuberance 12. When the cutting insert 2 is mounted in the seat 9, it projects from the tool body 1 past the protuberance 12 for cutting engagement with a gash of the workpiece W, see FIGS. 1-3.

Figure 7:
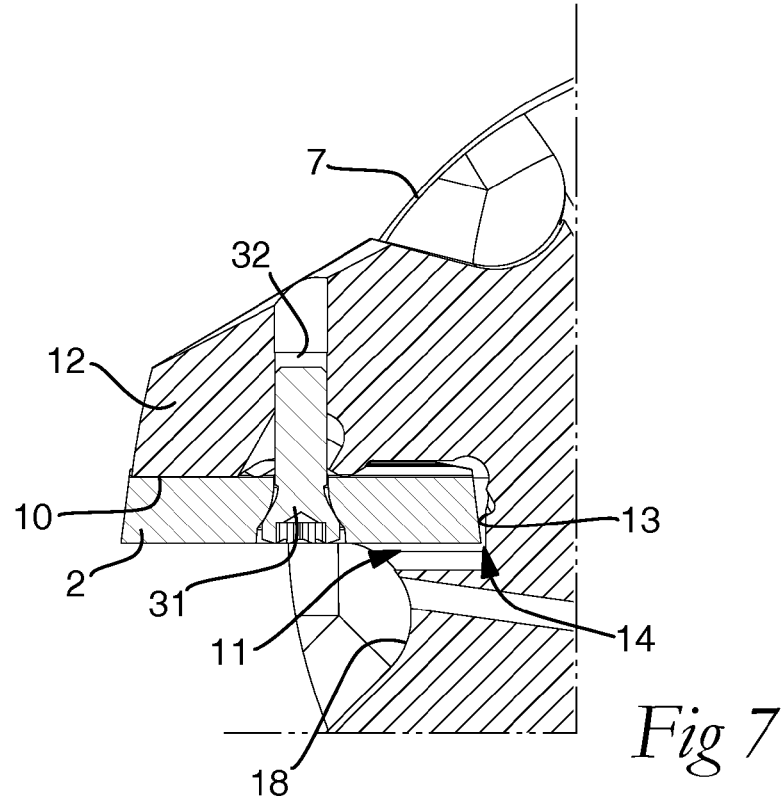
FIG. 7 shows a section view along the line VII-VII in FIG. 5.
Figure 8:
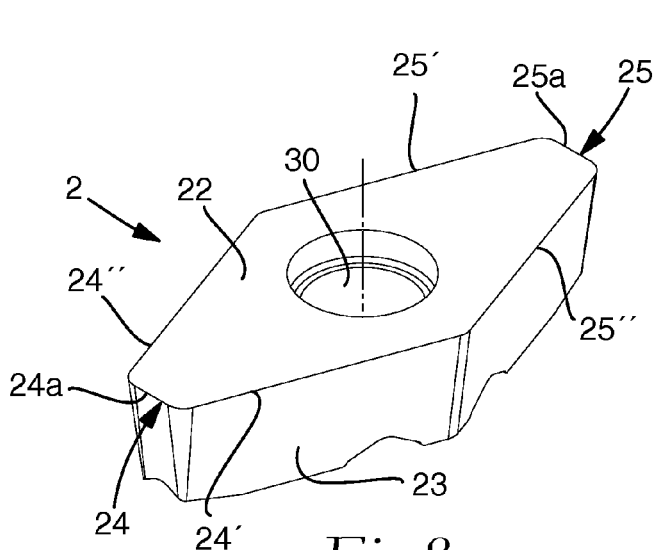
FIG. 8 shows a perspective view of a cutting insert according to a first exemplary embodiment.
Figure 9:
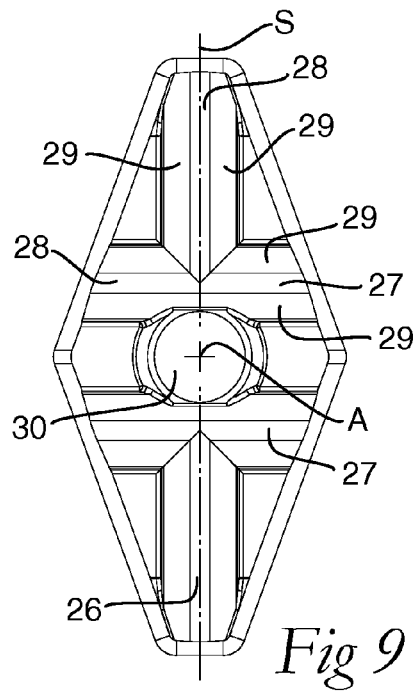
FIG. 9 shows a view from below of the cutting insert in FIG. 8.
Figure 10:
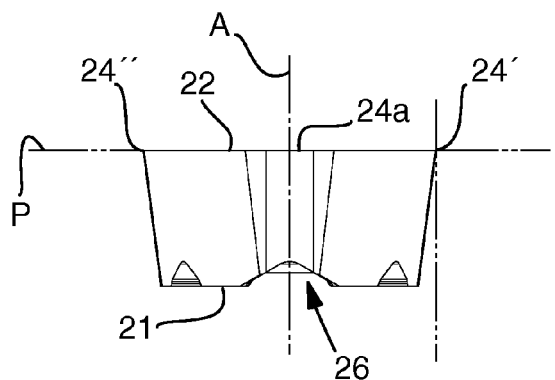
FIG. 10 shows a view from the front of the cutting insert in FIG. 8.
Figure 11:
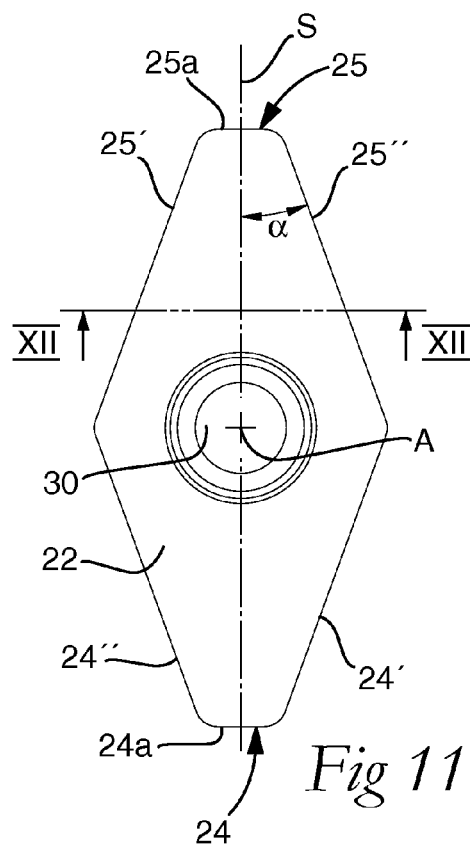
FIG. 11 shows a view from above of the cutting insert in FIG. 8.
Figure 12:
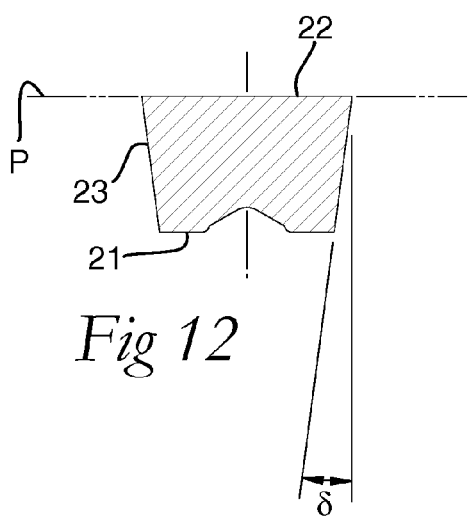
FIG. 12 shows a section along the line XII-XII in FIG. 11.
Figure 17:
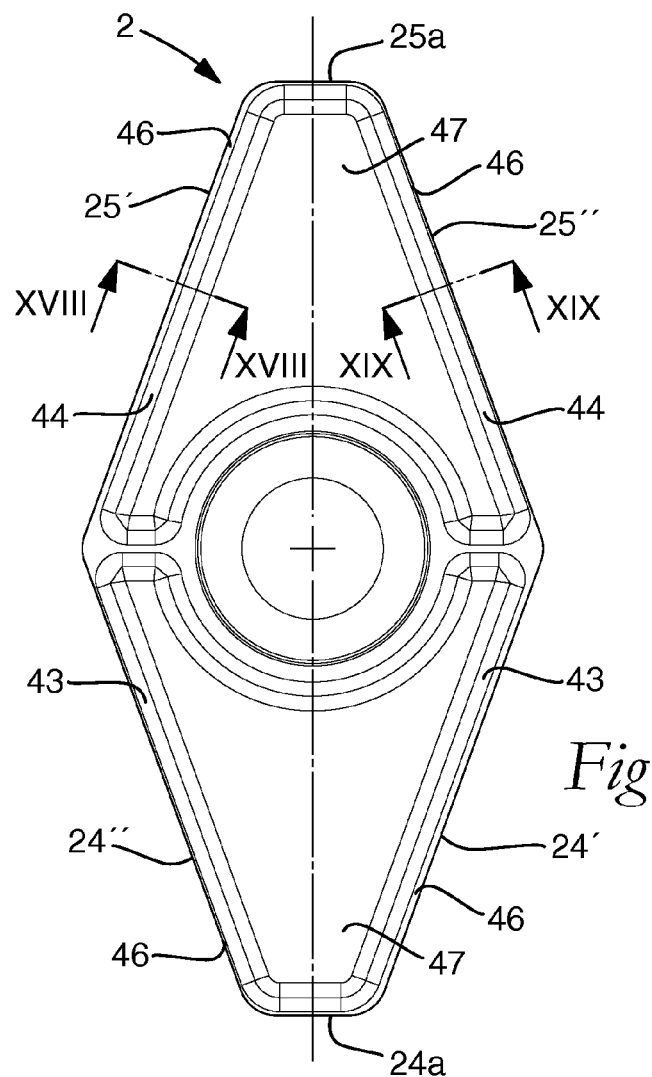
FIG. 17 shows a view from above of the cutting insert in FIG. 16.
Figure 18:
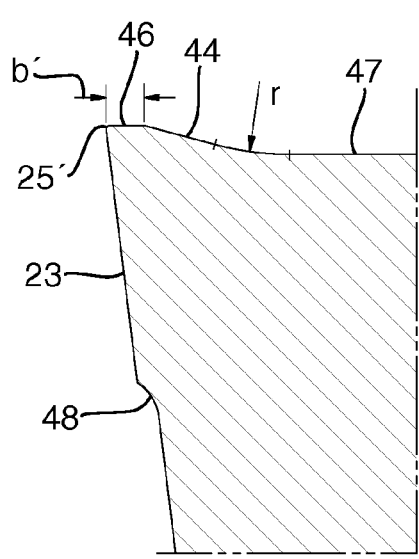
FIG. 18 shows a section along the line XVIII-XVIII in FIG. 17.
Figure 19:
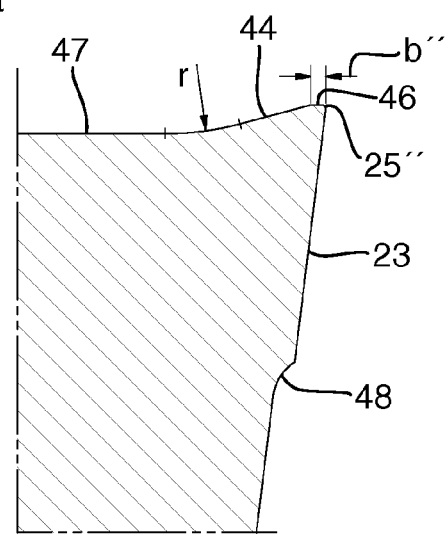
FIG. 19 shows a section along the line XIX-XIX in FIG. 17.

Each pocket 11 is limited by the support surface 10 and an inner limiting wall 13 formed in such a way that there is a gap 14 between the limiting wall 13 and the cutting insert 2 when the cutting insert 2 is mounted in the seat 9, see FIG. 7.

The support surface 10 of each seat 9 comprises a projection that extends from the support surface 10. The projection comprises a first elongate ridge 16 having a primarily radial extension, and a second elongate ridge 17 having a primarily axial extension. The first elongate ridge 16 intersects the second elongate ridge 17 at a right, or essentially right, angle. Each elongate ridge 16, 17 has an upper surface 18 that is essentially flat and parallel to the support surface 10, and two flank surfaces 19 that connect the upper surface 18 to the support surface 10. The two flank surfaces 19 form an obtuse angle with each other. This angle may be 90-140°, for instance 120°.

One of the cutting inserts 2 will now be described in more detail, reference being made to FIGS. 8-19. It should be noted that all cutting inserts 2 of the milling tool may be identical, but it is also possible to utilize different cutting inserts at different positions in the milling tool.

The cutting insert 2 is manufactured from a harder material than the tool body 1, for instance from cemented carbide. The cutting insert 2 comprises an under side 21, an opposite upper side 22, and a circumferential edge side 23 that connects the upper side 22 and the under side 21 and that forms a clearance surface. The upper side 22 forms a chip surface and extends in, or parallel to, an extension plane p. Also the under side 21 of the cutting insert 2 extends in an extension plane parallel to the extension plane p of the upper side 22 or chip surface. The first variant of the cutting insert 2, shown in FIGS. 8-12, has an upper side 22 that entirely coincides with the extension plane p and wherein the chip surface accordingly is entirely flat.

In the embodiments shown and the different variants in FIGS. 8-19, each cutting insert 2 comprises two cutting edges that are formed where the edge side 23 meets the upper side 22 or the chip surface, a first cutting edge 24 and a second opposite cutting edge 25. The first cutting edge 24 comprises a primary main cutting edge 24', a secondary main cutting edge 24", and a transverse end cutting edge 24a that extends between the primary main cutting edge 24' and the secondary main cutting edge 24". The second cutting edge 25 comprises a primary main cutting edge 25', a secondary main cutting edge 25", and a transverse end cutting edge 25a that extends between the primary main cutting edge 25' and the secondary main cutting edge 25". Thus, the cutting insert 2 comprises four main cutting edges 24', 24", 25' and 25".

In the embodiments shown, the cutting insert 2 is formed in such a way that the extension plane p comprises the above mentioned cutting edges 24, 25. A centre axis A extends through the under side 21 and the upper side 22. A symmetry line S is perpendicular to the centre axis A and extends parallel to the extension plane p. The primary main cutting edge 24' and the secondary main cutting edge 24" are symmetrically placed in respect of the symmetry line S and converge toward a point outside the end cutting edge 24a. Thus, this point is lying at a greater distance from the end cutting edge 24a than from the centre axis A. The primary main cutting edge 25' and the secondary main cutting edge 25" are also symmetrically placed in respect of the symmetry line S and converge toward a point outside the end cutting edge 25a. Thus, this point is lying at a greater distance from the end cutting edge 25a than from the centre axis A. Each one of the end cutting edges 24a and 25a may be straight, or preferably comprise a straight segment that is perpendicular, or essentially perpendicular, to the symmetry line S. Thus, the two end cutting edges 24a and 25a, or their straight segments, are parallel to each other, or essentially parallel to each other. Between said straight segments and the respective primary and secondary main cutting edges 24', 24"; 25', 25", there may be transition edges of a small radius of curvature.

The cutting insert 2 is indexable by rotation around the centre axis A between two opposite insert positions. In a first insert position, the first cutting edge 24 projects from the milling tool, and in a second insert position, the second cutting edge 25 projects from the milling tool.

The under side 21 of the cutting insert 2 has a recess that extends from the under side 21. The recess comprises a first elongate valley 26 and two second elongate valleys 27, one for each insert position. The first elongate valley 26 extends parallel to the symmetry line S and has a primarily radial extension when the cutting insert 2 is mounted in the milling tool. The second elongate valleys 27 intersect the first elongate valley 26 at a right, or essentially right, angle and have a primarily axial extension when the cutting insert 2 is mounted in the milling tool.

Each elongate valley 26 and 27 comprises a bottom surface 28 and two flank surfaces 29. The flank surfaces 29 connect the bottom surface 28 to the under side 21. These surfaces 28, 29 co-operate with the upper surface 18 and the flank surfaces 19 when the cutting insert 2 is mounted in the seat 9. The flank surfaces 29 form an obtuse angle with each other. This angle is identical with or equal to the obtuse angle between the flank surfaces 19.

Thus, the first elongate valley 26 is formed to be in engagement with the corresponding first elongate ridge 16 of the support surface 10. The second elongate valleys 27 are formed to be in engagement with the second elongate ridge 17 of the support surface 10. Thus, when the cutting insert 2 is mounted in the seat 9, the first elongate ridge 17 and the first elongate valley 26 are in engagement with each other. The second elongate ridge 17 is in engagement with one of the second elongate valleys 27. Thereby, the flank surfaces 19 are abutting against the flank surfaces 29. There may be a gap between the upper surface 18 and the bottom surface 28.

The cutting insert 2 comprises a fastening hole 30 that extends parallel to the centre axis A through the upper side 22 and the under side 21. In the embodiments shown, the centre axis A also forms a centre axis of the fastening hole 30. The cutting insert 2 is fastened in the seat 9 against the support surface 10 by means of a fixing screw 31 that extends through the fastening hole 30 into a threaded hole 32 extending through the support surface 10. The hole 32 is located radially outside the second elongate ridge 17 and extends through the first elongate ridge 16, see FIG. 4.

The upper side 22 of the indexable cutting insert 2 has a rhombic, or approximately rhombic, basic shape with a relatively long diagonal line coinciding with the symmetry line S, and a relatively short diagonal line being perpendicular to the relatively long diagonal line and to the symmetry line S. The symmetry line S forms a pressure angle $\alpha$ with each one of the main cutting edges 24', 24", 25' and 25", see FIG. 11. The pressure angle $\alpha$ is in the interval of 18-32°. In the embodiments shown, the pressure angle $\alpha$ is equal to, or essentially equal to, 20°. In another embodiment, the pressure angle $\alpha$ may be equal to, or essentially equal to, 30°. The size of the pressure angle $\alpha$ is depending on the cog to be manufactured.

Figure 6:
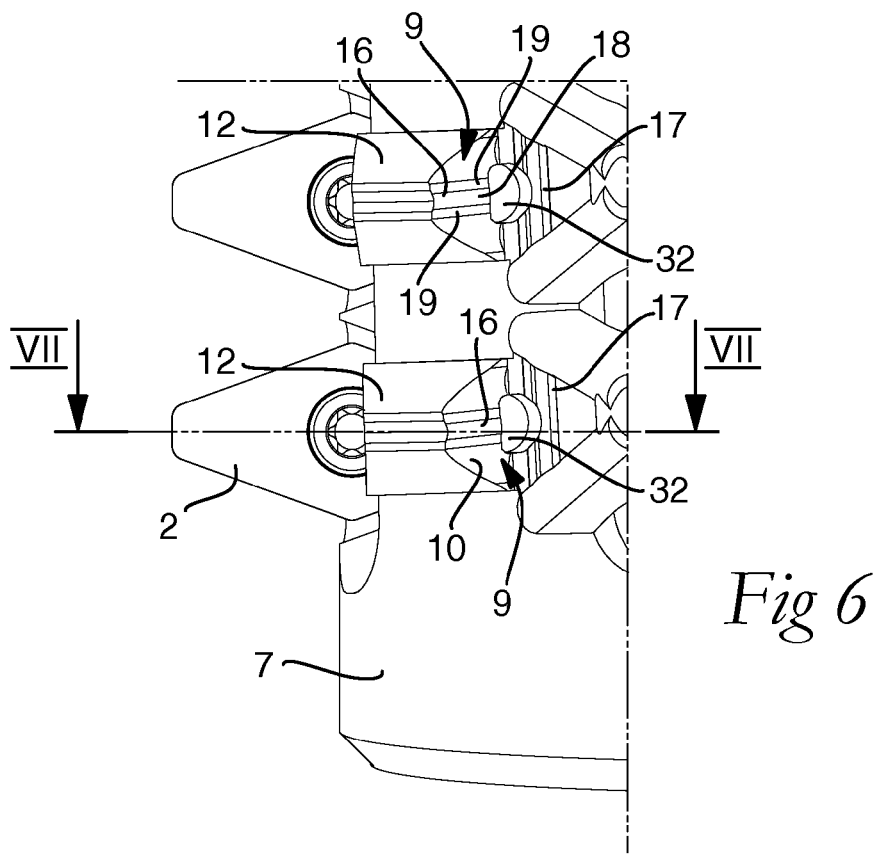
FIG. 6 shows a side view of a part of the milling tool in FIG. 1.

As is seen in FIGS. 4-6, the above mentioned pocket 11 forms a protection for the first cutting edge 24 or the second cutting edge 25, depending on which one that faces inward toward the rotation axis C1. The seats 9, and accordingly also the cutting inserts 2, are arranged in a plurality of rows. The shown milling tool comprises six such rows of cutting inserts 2. It should, however, be noted that the milling tool may comprise another number of rows of cutting inserts 2, for instance 4, 5, 7 or 8 rows. Each row comprises at least two cutting inserts 2, and seats 9. In the embodiments shown, each row comprises five cutting inserts 2 and seats 9. As is seen in FIGS. 1-5, each recess 8 extends parallel to each a row of cutting inserts 2 and seats 9. Each recess 8 borders on the respective row in such a way that each recess 8 forms a chip-receiving space at the chip surface of the cutting inserts 2 of such a row, which is seen in FIGS. 1 and 3.

Figure 2:
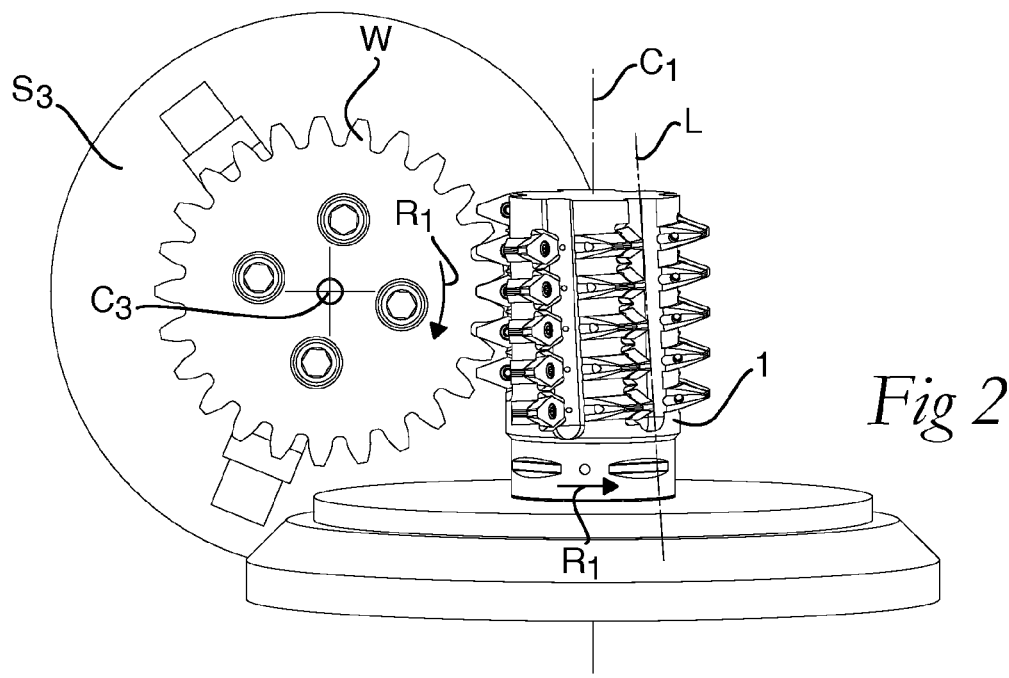
FIG. 2 shows the milling tool in FIG. 1 as seen in a side view.
Figure 3:
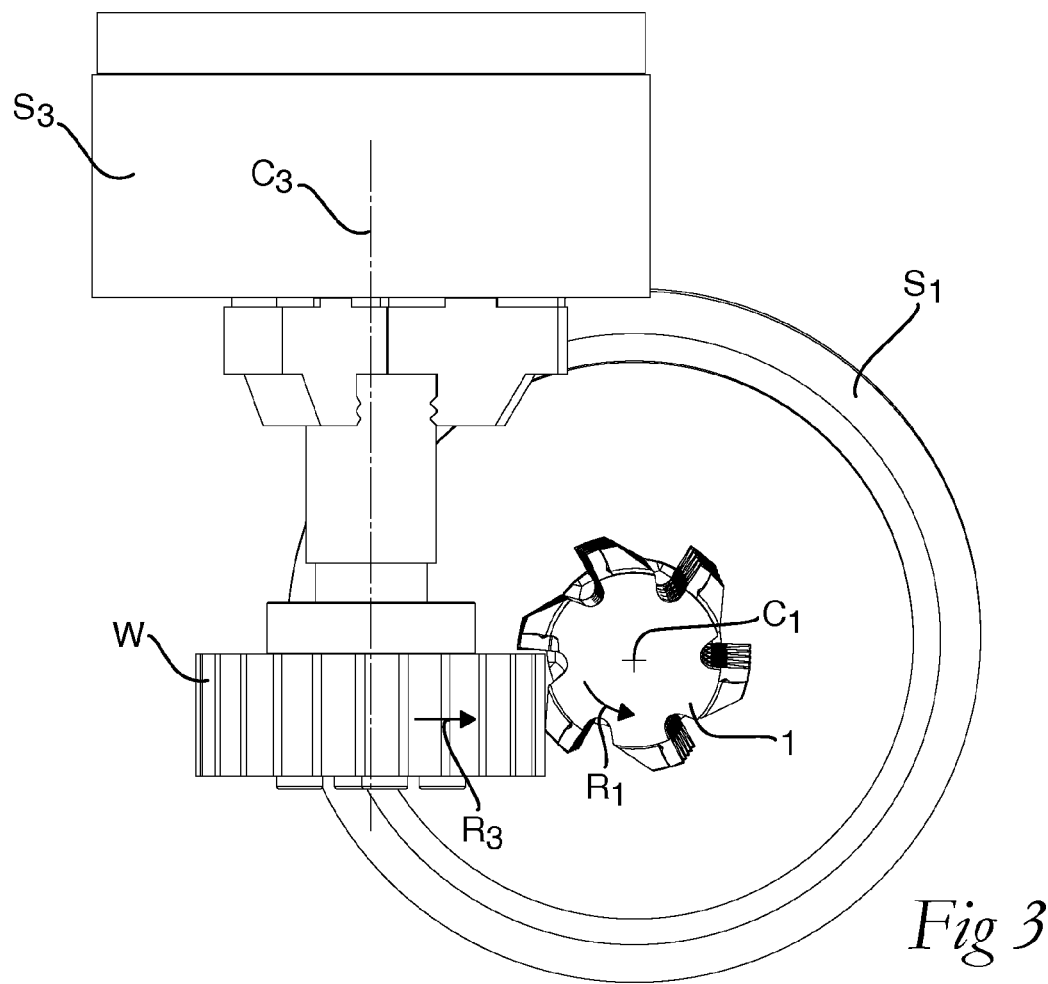
FIG. 3 shows the milling tool in FIG. 1 as seen in an end view.

Each row of cutting inserts 2, and seats 9, extends along a respective line L, see FIGS. 2 and 5, that is perpendicular to the tangent of the helix line x. The distance between adjacent rows of seats 9 and cutting inserts 2 is equidistant, i.e., this distance is equal for each pair of rows. Furthermore, the distance between adjacent cutting inserts 2 along the helix line x is also equidistant, i.e., also this distance is equal for each pair of adjacent cutting inserts 2.

The extension plane p of the chip surface of each cutting insert 2 of the milling tool has a normal that is parallel to the tangent of the helix line x where the same intersects the extension plane p. This means that the extension planes p of adjacent pairs of cutting inserts 2 of the same row form an angle with each other, which is seen in FIG. 3. In order to, by this geometry, guarantee a sufficient clearance in the cutting machining, the cutting inserts 2 are formed with a positive cutting geometry. This means that a normal to the extension plane p of the upper side or chip surface forms an acute clearance angle $\delta$ with the edge side 23 at least in the vicinity of the main cutting edges 25, see FIG. 12. The clearance angle $\delta$ is greater than zero.

According to a second embodiment, the cutting insert 2 shown in FIG. 13 differs from the one shown in FIGS. 8-12 in that it is formed for so-called protuberance cutting. In order to provide such a protuberance, the primary main cutting edges 24', 25' comprise each a primary outer edge deflection 37' in the vicinity of the respective end cutting edge 24a, 25a. In the same way, the secondary main cutting edges 24", 25" comprise each a secondary outer edge deflection 37" in the vicinity of the respective end cutting edge 24a, 25a. Thus, the primary and secondary outer edge deflections 37', 37" form protuberance insert edges that extend in, or parallel to, the extension plane p. These protuberance insert edges allow a deeper or wider cutout in the vicinity of the bottom surface of the gash of the workpiece W.

According to a third embodiment, the cutting insert 2 shown in FIG. 14 differs from the one shown in FIG. 13 in that it also is formed for so-called edge chamfer involute cutting. Such an edge chamfer involute cutting may be provided by the fact that the primary main cutting edges 24', 25' comprise each a primary inner edge deflection 39', 40' in the vicinity of the relatively short diagonal line, and that the secondary main cutting edges 24', 25' comprise each a secondary inner edge deflection 39", 40" in the vicinity of the relatively short diagonal line. As is seen in FIG. 14, the inner edge deflections 39', 39", 40', 40" extend up to the short diagonal line. The primary and secondary inner edge deflections 39', 39", 40', 40" extend in, or parallel to, the extension plane p.

According to a fourth embodiment, the cutting insert 2 shown in FIG. 15 differs from the one shown in FIG. 14 only in that it lacks edge deflections for protuberance cutting.

According to a fifth embodiment, the cutting insert 2 shown in FIGS. 16-19 differs from the one shown in FIGS. 8-15 in that it is formed with chip-forming means on the upper side 22. In the embodiment illustrated, these chip-forming means comprise a downward flank 43 that extends downward from a reinforcement bevel 46 inside the first cutting edge 24 and a downward flank 44 that extends downward from a reinforcement bevel 46 inside the second cutting edge 25.

The shown reinforcement bevel 46 extends inward from the primary and secondary main cutting edges 24', 24", 25', 25" and the end cutting edges 24*a*, 25*a*. It should be noted that it is possible to only arrange such a reinforcement bevel 46 along the primary main cutting edges 24', 15'. Alternatively, the reinforcement bevel may extend along the two main cutting edges but not along the end cutting edges 24*a*, 25*a*.

In the fifth embodiment, the reinforcement bevel 46 has a width b', b" across the primary and secondary main cutting edges 24', 24", 25', 25". This width b' along the primary main cutting edge 24', 25' is greater than the width b" along the secondary main cutting edge 24", 25", see FIGS. 17 to 19. In such a way, the cutting insert 2 obtains an asymmetrical design by the greater width b' of the reinforcement bevel 46 along the primary main cutting edges 24' and 25'. Said main cutting edges 24' and 25' are loaded heavier than the secondary main cutting edges 24" and 25". The narrower reinforcement bevel 46 of the secondary main cutting edges 24", 25" provides a lower cutting resistance than the wider reinforcement bevel 46 of the primary main cutting edges 24', 25'. Thereby, the embodiment illustrated means an optimization of the cutting insert 2 in respect of strength and energy consumption.

In the shown fifth embodiment, the reinforcement bevel 46 is flat or essentially flat. The reinforcement bevel 46 extends in the extension plane p. It is, however, possible to let the reinforcement bevel 46 extend upward, at least from the primary main cutting edges 24' and 25'. Thus, the reinforcement bevel 46 may have an angle in relation to the extension plane p ranging from 0° to, for instance, 2°.

The chip-forming means, i.e., the flanks 43 and 44, are formed to bend and break the chips formed during the gear milling. The flanks 43 and 44 may lean downward at an angle that is from 5° to 25° in relation to the extension plane p. The flanks 43 and 44 may also have a plurality of segments that are arranged one after the other from the cutting edges 24, 25 and that have different inclination in relation to the extension plane p. In the embodiment illustrated, the flanks 43, 44 transform into a flat centre surface 48 of the upper side 22 via a curved transition surface that may have a radius of curvature r.

The cutting insert 2 according to the fifth embodiment is also provided with a step 48 in the edge side 23. The proper clearance surface extends at a fixed acute clearance angle δ from the first and second cutting edges 24, 25 up to the step 48. Underneath the step 48 all the way to the under side 21, the edge side 23 may have an arbitrary shape.

The invention is not limited to the embodiments described above but may be varied and modified within the scope of the subsequent claims.

For instance, one or more of the seats 9 may be, or be formed of, replaceable insets or cassettes. The support surface 10 may also be formed on, or be formed of, a replaceable shim plate. Furthermore, the cutting inserts 2, or one or more of the cutting inserts 2, may lack the shown fastening hole and instead be fastened in the respective seat 9 by, for instance, a clamping member that presses against the upper side 22 of the cutting insert 2.

It should be noted that the different embodiments shown in FIGS. 8-19 may be combined with each other in various ways. For instance, the embodiments shown in FIGS. 13-15 may be provided with a reinforcement bevel 46 of the type defined for the fifth embodiment. The embodiments shown in FIGS. 13-15 may naturally also comprise a step 48 of the type shown for the fifth embodiment. It should also be noted that the cutting insert according to the fifth embodiment may have an edge side 23 having a constant clearance angle, as is shown in FIGS. 13-15. It should furthermore be noted that the cutting insert 2 does not need to be indexable. It is possible to provide the cutting insert 2 with the first cutting edge 24 and dispense with the second cutting edge 25. The part of the cutting insert 2 that faces away from the first cutting edge 24 can then have an arbitrary shape and, for instance, be provided with a rear abutment surface that is abutting against the seat in the milling tool and guarantees the radial position of the cutting insert 2 in respect of the rotation axis C1 of the milling tool. In this embodiment, the placement of the possible fastening hole 30 can be arbitrary. For instance, the fastening hole may be placed nearer the end cutting edge 24*a* than in the indexable embodiments.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A hobbing insert for a milling tool formed for gear milling in the form of hobbing of a workpiece having cogs, the hobbing insert comprising:
   an under side;
   an opposite upper side that forms a chip surface and extends parallel to an extension plane (p);
   a circumferential edge side that connects the upper side and the under side;
   a centre axis (A) that extends through the under side and the upper side;
   a symmetry line (S) that is perpendicular to and intersects the centre axis (A); and
   a first cutting edge comprising a primary main cutting edge and a secondary main cutting edge, which are symmetrical in respect of the symmetry line (S) and formed where the circumferential edge side meets the chip surface, and a transverse end cutting edge that extends between the primary main cutting edge and the secondary main cutting edge and that comprises a straight segment,
   wherein a normal to the extension plane (p) forms an acute clearance angle (δ) with the circumferential edge side along the primary main cutting edge, secondary main cutting edge and transverse end cutting edge of the first cutting edge so that the hobbing insert obtains a positive cutting geometry, wherein the under side has a recess that extends from the under side and that is arranged to be in engagement with a corresponding projection of a support surface of the milling tool, wherein the recess consists of a single first elongate valley that extends parallel to the symmetry line (S) and transverse to the transverse cutting edge, wherein the first elongate valley includes a bottom surface and two flank surfaces and the flank surfaces form a first obtuse angle with each other, wherein the chip surface comprises a reinforcement bevel that extends inward from only the primary main cutting edges.

2. The hobbing insert according to claim 1, wherein the straight segment extends perpendicular to the symmetry line (S).

3. The hobbing insert according to claim 1, wherein the symmetry line (S) forms a pressure angle α with each one of said primary and secondary main cutting edges, and wherein the pressure angle α is in the interval of 18-32°.

4. The hobbing insert according to claim 1, wherein the reinforcement bevel extends upward from the primary main cutting edge.

5. The hobbing insert according to claim 1, wherein the chip surface comprises chip-forming means that are formed to bend and break the chips formed during the gear milling.

6. The hobbing insert according to claim 5, wherein the chip-forming means comprise a flank that leans downward and extends inward from the reinforcement bevel.

7. The hobbing insert according to claim 1, wherein said primary main cutting edge comprises a primary outer edge deflection in the vicinity of the end cutting edge, and said secondary main cutting edge comprises a secondary outer edge deflection in the vicinity of the end cutting edge.

8. The hobbing insert according to claim 7, wherein the primary and secondary outer edge deflections extend parallel to the extension plane (p).

9. The hobbing insert according to claim 1, wherein the hobbing insert comprises a second cutting edge comprising a primary main cutting edge and a secondary main cutting edge, which are symmetrical in respect of the symmetry line and formed where the circumferential edge side meets the chip surface, and a transverse end cutting edge that extends between the primary main cutting edge and the secondary main cutting edge, and wherein the hobbing insert is indexable by rotation around the centre axis (A) between a first insert position, in which the first cutting edge is in engagement with the workpiece, and a second insert position, in which the second cutting edge is in engagement with the workpiece.

10. The hobbing insert according to claim 9, wherein the upper side of the hobbing insert has a rhombic basic shape with a relatively long diagonal line coinciding with the symmetry line (S), and a relatively short diagonal line being perpendicular to the relatively long diagonal line.

11. The hobbing insert according to claim 9, wherein said primary main cutting edges comprise each a primary inner edge deflection in the vicinity of the relatively short diagonal line, and said secondary main cutting edges comprise each a secondary inner edge deflection in the vicinity of the relatively short diagonal line.

12. The hobbing insert according to claim 11, wherein the primary and secondary inner edge deflections extend parallel to the extension plane.

13. The hobbing insert according to claim 1, wherein the hobbing insert comprises a fastening hole that extends through the upper side and the under side, and wherein the hobbing insert is formed to be attached in a seat of the milling tool by means of a fixing screw that extends through the fastening hole into a threaded hole of the milling tool.

14. The hobbing insert according to claim 9, wherein a normal to the extension plane (p) forms an acute clearance angle (δ) with the circumferential edge side along the primary main cutting edge, secondary main cutting edge and transverse end cutting edge of the second cutting edge so that the hobbing insert obtains a positive cutting geometry.

15. The hobbing insert according to claim 1, wherein the chip surface comprises a reinforcement bevel that extends inward from the transverse end cutting edge.

16. The hobbing insert according to claim 1, wherein the circumferential edge side includes a step, wherein a first portion of the circumferential edge side located between the step and the upper side defines a plane that is oriented at the acute clearance angle, and wherein a second portion of the circumferential edge side located between the step the under side is not contained in the plane defined by the first portion of the circumferential edge side.

17. A hobbing insert for a milling tool formed for gear milling in the form of hobbing of a workpiece having cogs, the hobbing insert comprising:

an under side;

an opposite upper side that forms a chip surface and extends parallel to an extension plane (p);

a circumferential edge side that connects the upper side and the under side;

a centre axis (A) that extends through the under side and the upper side;

a symmetry line (S) that is perpendicular to and intersects the centre axis (A); and a first cutting edge comprising a primary main cutting edge and a secondary main cutting edge, which are symmetrical in respect of the symmetry line (S) and formed where the circumferential edge side meets the chip surface, and a transverse end cutting edge that extends between the primary main cutting edge and the secondary main cutting edge and that comprises a straight segment, wherein a normal to the extension plane (p) forms an acute clearance angle (δ) with the circumferential edge side along the primary main cutting edge, secondary main cutting edge and transverse end cutting edge of the first cutting edge so that the hobbinq insert obtains a positive cutting geometry, wherein the under side has a recess that extends from the under side and that is arranged to be in engagement with a corresponding proiection of a support surface of the milling tool, wherein the recess consists of a single first elongate valley that extends parallel to the symmetry line (S) and transverse to the transverse cutting edge, wherein the first elongate valley includes a bottom surface and two flank surfaces and the flank surfaces form a first obtuse angle with each other, wherein the chip surface comprises a reinforcement bevel that extends inward from both of said primary and secondary main cutting edges, wherein the reinforcement bevel has a width across said primary and secondary main cutting edges, and wherein the width along the primary main cutting edge is greater than the width along the secondary main cutting edge.

18. The hobbing insert according to claim 17, wherein the reinforcement bevel extends upward at least from the primary main cutting edge.

19. The hobbing insert according to claim 17, wherein the straight segment extends perpendicular to the symmetry line (S).

20. The hobbing insert according to claim 17, wherein the symmetry line (S) forms a pressure angle a with each one of said primary and secondary main cutting edges, and wherein the pressure angle α is in the interval of 18-32°.

21. The hobbing insert according to claim 17, wherein the chip surface comprises chip-forming means that are formed to bend and break the chips formed during the gear milling.

22. The hobbing insert according to claim 21, wherein the chip-forming means comprise a flank that leans downward and extends inward from the reinforcement bevel.

23. The hobbing insert according to claim 17, wherein said primary main cutting edge comprises a primary outer edge deflection in the vicinity of the end cutting edge, and said secondary main cutting edge comprises a secondary outer edge deflection in the vicinity of the end cutting edge.

24. The hobbing insert according to claim 23, wherein the primary and secondary outer edge deflections extend parallel to the extension plane (p).

25. The hobbing insert according to claim 17, wherein the hobbing insert comprises a second cutting edge comprising a primary main cutting edge and a secondary main cutting edge, which are symmetrical in respect of the symmetry line and formed where the circumferential edge side meets the chip surface, and a transverse end cutting edge that extends between the primary main cutting edge and the secondary main cutting edge, and wherein the hobbing insert is indexable by rotation around the centre axis (A) between a first insert position, in which the first cutting edge is in engagement with the workpiece, and a second insert position, in which the second cutting edge is in engagement with the workpiece.

26. The hobbing insert according to claim 25, wherein the upper side of the hobbing insert has a rhombic basic shape with a relatively long diagonal line coinciding with the symmetry line (S), and a relatively short diagonal line being perpendicular to the relatively long diagonal line.

27. The hobbing insert according to claim 25, wherein said primary main cutting edges comprise each a primary inner edge deflection in the vicinity of the relatively short diagonal line, and said secondary main cutting edges comprise each a secondary inner edge deflection in the vicinity of the relatively short diagonal line.

28. The hobbing insert according to claim 27, wherein the primary and secondary inner edge deflections extend parallel to the extension plane.

29. The hobbing insert according to claim 25, wherein a normal to the extension plane (p) forms an acute clearance angle (δ) with the circumferential edge side along the primary main cutting edge, secondary main cutting edge and transverse end cutting edge of the second cutting edge so that the hobbing insert obtains a positive cutting geometry.

30. The hobbing insert according to claim 17, wherein the hobbing insert comprises a fastening hole that extends through the upper side and the under side, and wherein the hobbing insert is formed to be attached in a seat of the milling tool by means of a fixing screw that extends through the fastening hole into a threaded hole of the milling tool.

31. The hobbing insert according to claim 17, wherein the chip surface comprises a reinforcement bevel that extends inward from the transverse end cutting edge.

32. The hobbing insert according to claim 17, wherein the circumferential edge side includes a step, wherein a first portion of the circumferential edge side located between the step and the upper side defines a plane that is oriented at the acute clearance angle, and wherein a second portion of the circumferential edge side located between the step the under side is not contained in the plane defined by the first portion of the circumferential edge side.

* * * * *